US008595830B1

(12) United States Patent
Lee

(10) Patent No.: US 8,595,830 B1
(45) Date of Patent: Nov. 26, 2013

(54) METHOD AND SYSTEM FOR DETECTING MALWARE CONTAINING E-MAILS BASED ON INCONSISTENCIES IN PUBLIC SECTOR "FROM" ADDRESSES AND A SENDING IP ADDRESS

(75) Inventor: Martin Lee, Oxford (GB)

(73) Assignee: Symantec Corporation, Mountain View, CA (US)

( * ) Notice: Subject to any disclaimer, the term of this patent is extended or adjusted under 35 U.S.C. 154(b) by 561 days.

(21) Appl. No.: 12/844,738

(22) Filed: Jul. 27, 2010

(51) Int. Cl.
*H04L 29/06* (2006.01)
(52) U.S. Cl.
USPC ............... 726/22; 726/23; 726/24; 726/25; 713/188; 713/193; 709/206; 705/58
(58) Field of Classification Search
USPC .......................................................... 726/22
See application file for complete search history.

(56) References Cited

U.S. PATENT DOCUMENTS

| | | | |
|---|---|---|---|
| 6,052,709 A | 4/2000 | Paul | |
| 7,647,411 B1* | 1/2010 | Schiavone et al. | 709/229 |
| 7,653,695 B2* | 1/2010 | Flury et al. | 709/206 |
| 8,239,687 B2* | 8/2012 | Stolfo | 713/188 |
| 2004/0111632 A1 | 6/2004 | Halperin | |
| 2004/0215977 A1 | 10/2004 | Goodman et al. | |
| 2006/0031306 A1 | 2/2006 | Haverkos | |
| 2006/0075099 A1 | 4/2006 | Pearson et al. | |
| 2006/0256729 A1* | 11/2006 | Chen et al. | 370/250 |
| 2007/0070921 A1 | 3/2007 | Quinlan et al. | |
| 2007/0079379 A1 | 4/2007 | Sprosts et al. | |
| 2007/0220607 A1 | 9/2007 | Sprosts et al. | |
| 2008/0133676 A1* | 6/2008 | Choisser et al. | 709/206 |
| 2008/0222734 A1* | 9/2008 | Redlich et al. | 726/26 |
| 2010/0077483 A1* | 3/2010 | Stolfo et al. | 726/24 |
| 2010/0205014 A1* | 8/2010 | Sholer et al. | 705/4 |
| 2011/0191847 A1* | 8/2011 | Davis et al. | 726/22 |

OTHER PUBLICATIONS

Kumar, Brijesh; Katsinis, Constantine. A Network Based Approach to Malware Detection in Large IT Infrastructures. 9th IEEE International Symposium on Network Computing and Applications (NCA). Pub. Date: 2010. Relevant pp. 188-191. Found on the World Wide Web at: http://ieeexplore.ieee.org/stamp/stamp.jsp?tp=&arnumber=5598211.*
Antrosio et al., "Malware Defense Using Network Security Authentication", Proceedings of the IEEE International Information Assurance Workshop, 2005, 13 pages, IEEE.

(Continued)

*Primary Examiner* — Nathan Flynn
*Assistant Examiner* — Jeremiah Avery
(74) *Attorney, Agent, or Firm* — McKay and Hodgson, LLP; Serge J. Hodgson; Sean P. Lewis

(57) ABSTRACT

A method and apparatus for detecting malware containing e-mails based on inconsistencies between a governmental agency "From" address and a sending IP address whereby an incoming e-mail is analyzed to determine if the incoming e-mail includes a "From" address having a domain suffix that is normally associated with a governmental agency, such as a .gov, .gov.uk, .go.jp, or any similar governmental domain suffix. The connecting IP address or IP addresses within the received headers associated with the incoming e-mail are then analyzed to determine the geographical locations through which the incoming e-mail passed. If the geographical locations associated with these sending IP addresses of the incoming e-mail are not consistent with the country indicated by the domain suffix in the governmental "From" address of the incoming e-mail then the protective action is taken.

19 Claims, 5 Drawing Sheets

(56) References Cited

OTHER PUBLICATIONS

Comodo, "Undetected Malware Threats a Growing Risk for Internet Users", Press Release, Apr. 1, 2010, 2 pages [online]. Retrieved on Sep. 14, 2010 from the Internet: <URL:http://www.prlog.org/10606100-undetected-malware-threats-growing-risk-for-internet-users.html>.

Entrust, Inc., "Fraud Detection Solution Helps Banks Stop Latest Malware Threats", Oct. 28, 2009, 2 pages [online]. Retrieved on Sep. 14, 2010 from the Internet: <URL:http//www.ababj.com/techtopics-plus/entrust-s-fraud-detection-solution-helps-financial-institutions-stop-latest-malware-threats.html>.

Entrust, Inc., "Stopping Man-in-the-Browser—Entrust, TowerGroup Explore Critical Threats, Solutions", News Releases, Feb. 19, 2010, 2 pages [online]. Retrieved on Sep. 14, 2010 from the Internet: <URL:http://www.entrust.com/news/index.php?s=43&item=706>.

Xie et al., "pBMDS: A Behavior-based Malware Detection System for Cellphone Devices", WiSec '10: Proceedings of the Third ACM Conference on Wireless Network Security, Mar. 2010, pp. 37-48, ACM.

No author provided, "E-mail Authentication", last modified Sep. 1, 2010, 6 pages [online]. Retrieved on Sep. 14, 2010 from the Internet: <URL:http://en.wikipedia.org/wiki/E-mail_authentication>.

No author provided, "E-mail Authentication: Encyclopedia", 4 pages [online]. Retrieved on Sep. 14, 2010 from the Internet: <URL:http://www.associatepublisher.com/e/e/e-mail_authentication.htm>.

Portokalidis et al., "SweetBait: Zero-Hour Worm Detection and Containment Using Low- and High-Interaction Honeypots", Computer Networks, vol. 51, No. 5, Jan. 20, 2007, pp. 1256-1274, Elsevier Science Publishers B.V., Amsterdam, NL.

Bustamante, "A very large malware honeynet", Dec. 19, 2006, pp. 1-3 [online]. Retrieved on Mar. 9, 2010 from the Internet: <URL:http://research.pandasecurity.com/A-very-large-malware-honeybet/>.

EHOW, "How to Detect an Email Worm", no date provided, one page [online]. Retrieved on Mar. 9, 210 from the Internet: <URL:http://www.ehow.com/how_2108306_detect-email-worm.html>.

Endicott-Popovsky et al., "Use of Deception to Improve Client Honeypot Detection of Drive-by-Download Attacks", Jul. 15, 2009, Springer Berlin/Heidelberg, abstract, pp. 1-3 [online ]. Retrieved on May 4, 2010 from the Internet: <URL:http://www.springerlink.com/content/4227h618nt48345v/>.

Gellert, "Re: Is it one way to detect honeypot?", Feb. 12, 2004, one page [online]. Retrieved on Mar. 9, 2010 from the Internet: <URL:http://lists.virus.org/honeypots-0402/msg00024.html>.

Lam, "E-mail Viruses Detection: Detect E-mail Virus by Network Traffic", Mar. 24, 2002, pp. 1-30.

Lee, "Method and System for Using Spam E-Mail Honeypots to Identify Potential Malware Containing E-Mails", U.S. Appl. No. 12/690,638, filed Jan. 20, 2010.

Lin et al., "Splog Detection Using Content, Time and Link Structures", 2007, pp. 2030-2033, IEEE.

Provos et al., *Virtual Honeypots: From Botnet Tracking to Intrusion Detection*, Aug. 2, 2007, Addison Wesley, description, pp. 1-8 [online]. Retrieved May 4, 2010 from the Internet: <URL:http://www.amazon.co.uk/Virtual-Honeypots-Tracking-Intrusion-Detection/dp/0321336321>.

Riden, "Using Nepenthes Honeypots to Detect Common Malware", Nov. 7, 2006, pp. 1-5 [online]. Retrieved on Mar. 9, 2010 from the Internet: <URL:http://www.securityfocus.com/infocus/1880>.

Tabish et al., "Malware Detection Using Statistical Analysis of Byte-Level File Content, *CSI-KDD '09 Proceedings of the ACM SIGKDD Workshop on CyberSecurity and Intelligence Informatics*", Jun. 28, 2009, 9 pages, ACM, Paris, France.

* cited by examiner

METHOD AND SYSTEM FOR DETECTING MALWARE CONTAINING E-MAILS BASED ON INCONSISTENCIES IN PUBLIC SECTOR "FROM" ADDRESSES AND A SENDING IP ADDRESS

BACKGROUND OF THE INVENTION

Computing systems utilized by the public sector, e.g., governments and government agencies, and elements of the private sector that are associated with the public sector, such as defense contractors, financial institutions, and various research facilities, have recently become targets of malware attacks specifically crafted to compromise specific public sector, and associated private sector, data.

This "targeted" or "bespoke" malware is often injected into the public sector, and associated private sector, computing systems via e-mails containing targeted Trojan, or other, malware that are highly researched, crafted, and customized to the intended recipient. Therefore, unlike more traditional "mass" malware attacks that use similar e-mails as the insertion vector for numerous attacks, these targeted malware attacks have very low levels of occurrence, and are often single occurrence attacks. Consequently, the traditional mechanisms of determining malware containing e-mail signatures and then blocking future e-mails having these signatures are relatively ineffective.

One mechanism that has been recently employed by some malware distributors is to create targeted malware containing e-mails that include a "From" address that includes a domain that appears to indicate the e-mail originated from a government or public sector organization, i.e., a government agency, that the recipient would typically automatically trust. This practice of providing a false "From" address is commonly referred to as "spoofing".

In a typical instance where a targeted malware containing e-mail includes a spoofed government "From" address, the "From" address includes a government associated domain suffix such as, but not limited to, those ending in: ".gov", indicating the e-mail is from a United States government agency source; ".gov.uk", indicating the e-mail is from a United Kingdom government agency source; ".go.jp" indicating the e-mail is from a Japanese government agency source; or any one of numerous other "From" address domain suffixes that indicate a given country governmental agency source.

Since as noted, targeted malware attacks have very low levels of occurrence so traditional mechanisms of identifying malware containing e-mails are relatively ineffective, and many public sector, and associated private sector recipients, are likely to assume that an e-mail having a "From" address that indicates a governmental source is trustworthy, these types of targeted malware attacks with spoofed governmental agency "From" addresses are a significant problem.

In addition, since the public sector and associated private sector recipients are often dealing with computing systems that contain highly classified data, and in some cases data relating to national security, these targeted malware attacks with spoofed governmental agency "From" addresses can be extremely serious. Indeed, it is currently suspected that some of these targeted malware attacks with spoofed governmental agency "From" addresses are sponsored by foreign powers. However, current malware detection systems are largely unable to detect and block these types of malware attacks because of the bespoke nature of the malware and the very low volume of occurrence. Consequently, this serious threat to public sector data remains largely undetectable, and unopposed, using currently available malware detection systems.

SUMMARY

According to one embodiment, a method and apparatus for detecting malware containing e-mails based on inconsistencies between a governmental agency "From" address and a sending IP address includes a process for detecting malware containing e-mails based on inconsistencies between a governmental agency "From" address and a sending IP address that makes use of the fact that most legitimate governmental agency e-mails are sent from the country indicated by the governmental "From" address. For instance, an e-mail having a "From" address ending in ".gov", indicating the e-mail is from a United States government agency source, would be expected to originate, and/or connect through, locations in the United States, or a small set of other locations. Likewise, an e-mail having a "From" address ending in ".gov.uk", indicating the e-mail is from a United Kingdom government agency source, should originate, and/or connect through, locations in the United Kingdom, or a small set of other locations. Similarly, it would be expected that an e-mail having a "From" address ending in ".go.jp", indicating the e-mail is from a Japanese government agency source should originate, and/or connect through, locations in Japan.

Using this assumption, according to one embodiment of a method and apparatus for detecting malware containing e-mails based on inconsistencies between a governmental agency "From" address and a sending IP address, an incoming e-mail is analyzed to determine if the incoming e-mail includes a "From" address having a domain suffix that is normally associated with a governmental agency, such as a .gov, .gov.uk, .go.jp, or any similar governmental domain suffix. In one embodiment, the connecting IP address or IP addresses within the received headers associated with the incoming e-mail are then analyzed to determine the geographical locations through which the incoming e-mail passed, in one embodiment using the Classless Inter-Domain Routing (CIDR) associated with the connecting IP address or IP addresses within the received headers associated with the incoming e-mail. In one embodiment, an attempt is made to find the origin, or earliest, sending IP address in an effort to determine the geographical location of the origin of the incoming e-mail. In one embodiment, if the geographical locations associated with the connecting IP address or IP addresses within the received headers of the incoming e-mail are not consistent with the country indicated by the domain suffix in the governmental "From" address of the incoming e-mail, and/or if the CIDR associated with the connecting IP address or IP addresses within the received headers associated with the incoming e-mail are known to have previously been associated with targeted malware, then protective action is taken including, but not limited to any one or more of: blocking the incoming e-mail; flagging the incoming e-mail as suspect and alerting the recipient; performing further analysis on the incoming e-mail; or any other form of protective action as discussed herein, and/or as known in the art at the time of filing, and/or as developed after the time of filing.

Using the method and apparatus for detecting malware containing e-mails based on inconsistencies between a governmental agency "From" address and a sending IP address discussed herein, the fact that most legitimate governmental agency e-mails are sent from the country indicated by the governmental "From" address, and the fact that the connecting IP address or IP addresses within the received headers associated with an incoming e-mail can be used to determine the geographical locations through which the incoming e-mail has passed, are used to detect potential targeted malware containing e-mails having spoofed governmental "From" address. Therefore, the method and apparatus for detecting malware containing e-mails based on inconsistencies between a governmental agency "From" address and a sending IP address discussed herein, provides a mechanism to potentially thwart this serious threat to public sector data that is unavailable using current detection systems.

Figure 1:
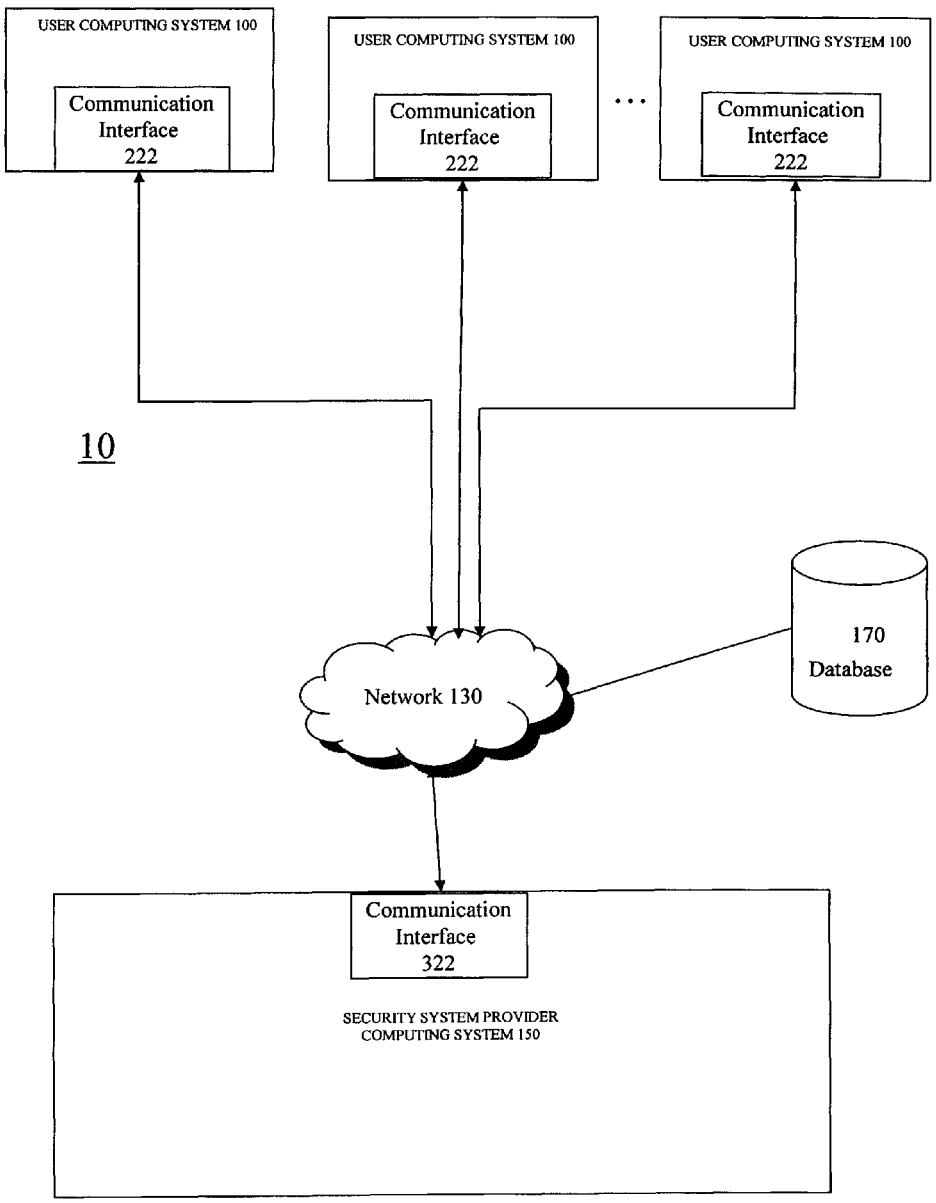
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment, a method and apparatus for detecting malware containing e-mails based on inconsistencies between a governmental agency "From" address and a sending IP address includes a process for detecting malware containing e-mails based on inconsistencies between a governmental agency "From" address and a sending IP address that makes use of the fact that most legitimate governmental agency e-mails are sent from the country indicated by the governmental "From" address. For instance, an e-mail having a "From" address ending in ".gov", indicating the e-mail is from a United States government agency source, would be expected to originate, and/or connect through, locations in the United States, or a small set of other locations. Likewise, an e-mail having a "From" address ending in ".gov.uk", indicating the e-mail is from a United Kingdom government agency source, should originate, and/or connect through, locations in the United Kingdom, or a small set of other locations. Similarly, it would be expected that an e-mail having a "From" address ending in ".go.jp", indicating the e-mail is from a Japanese government agency source should originate, and/or connect through, locations in Japan.

Using this assumption, according to one embodiment of a method and apparatus for detecting malware containing e-mails based on inconsistencies between a governmental agency "From" address and a sending IP address, an incoming e-mail is analyzed to determine if the incoming e-mail includes a "From" address having a domain suffix that is normally associated with a governmental agency, such as a .gov, .gov.uk, .go.jp, or any similar governmental domain suffix.

In one embodiment, the connecting IP address or IP addresses within the received headers associated with the incoming e-mail are then analyzed to determine the geographical locations through which the incoming e-mail passed, in one embodiment using the Classless Inter-Domain Routing (CIDR) associated with the connecting IP address or IP addresses within the received headers associated with the incoming e-mail. In one embodiment, an attempt is made to find the origin, or earliest, sending IP address in an effort to determine the geographical location of the origin of the incoming e-mail.

In one embodiment, if the geographical locations associated with the sending IP addresses of the incoming e-mail are not consistent with the country indicated by the domain suffix in the governmental "From" address of the incoming e-mail, and/or if the CIDR associated with the sending IP addresses associated with the incoming e-mail are known to have previously been associated with targeted malware, then protective action is taken including, but not limited to any one or more of: blocking the incoming e-mail; flagging the incoming e-mail as suspect and alerting the recipient; performing further analysis on the incoming e-mail; or any other form of protective action as discussed herein, and/or as known in the art at the time of filing, and/or as developed after the time of filing.

FIG. 1 shows a block diagram of an exemplary hardware system 10 suitable for implementing one embodiment of a process for detecting malware containing e-mails based on inconsistencies between a governmental agency "From" address and a sending IP address, such as exemplary process 400 of FIG. 4 and 500 of FIG. 5, discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for detecting malware containing e-mails based on inconsistencies between a governmental agency "From" address and a sending IP address in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for detecting malware containing e-mails based on inconsistencies between a governmental agency "From" address and a sending IP address in accordance with at least one of the embodiments as described herein and is accessible by, controlled by, and/or otherwise associated with, a security system provider. As used herein, a security system provider includes, but is not limited to, any party, person, application, system, or entity that desires to identify and block the transmission of malware and/or malware containing e-mails.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for detecting malware containing e-mails based on inconsistencies between a governmental agency "From" address and a sending IP address, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
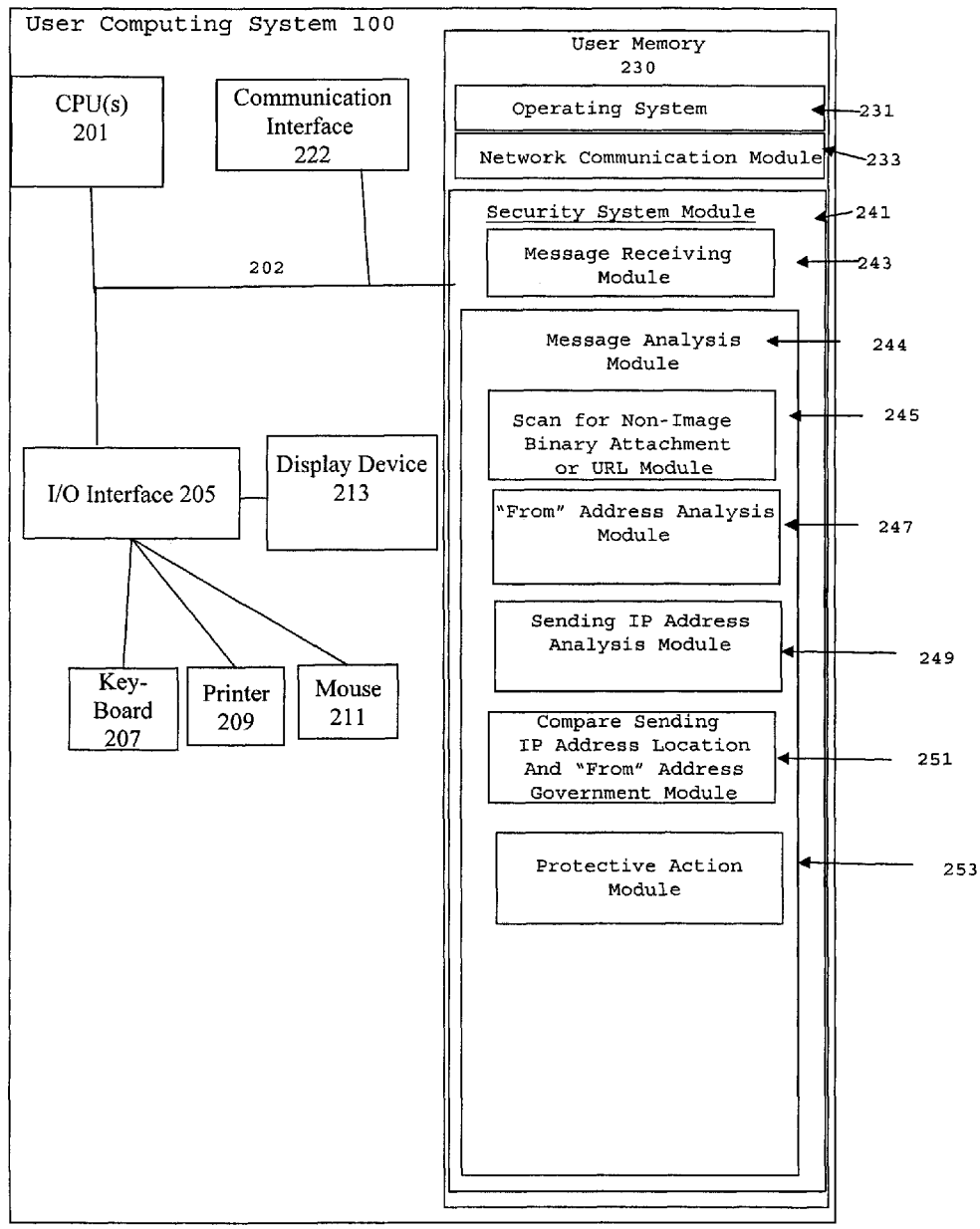
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions, for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing e-mails, or other messages, being sent to, or through, user computing system(s) 100 and/or security system provider computing system 150 of FIG. 1 to identify malware and/or malware containing e-mails and to take one or more protective measures.

As also seen in FIG. 2, in one embodiment, security system module 241 of user memory 230 includes: message receiving module 243 that includes procedures, data, and/or instructions for receiving messages sent to user computing system(s) 100 via communication interface 222 and/or security system provider computing system 150 of FIG. 1; and message analysis module 244 that includes procedures, data, and/or instructions for scanning e-mails, or other messages, being sent to, or through, user computing system(s) 100 and/or security system provider computing system 150 of FIG. 1 to identify malware and/or malware containing e-mails and to take one or more protective measures.

As also seen in FIG. 2, in one embodiment, message analysis module 244 includes scan for non-image binary attachment or URL module 245 that includes procedures, data, and/or instructions, for analyzing incoming messages in the live message stream to identify binary attachments or URLs attached to the incoming messages.

As also seen in FIG. 2, in one embodiment, message analysis module 244 includes "From" address analysis module 247 that includes procedures, data, and/or instructions, for analyzing incoming messages in a live message stream to determine if the "From" address of an incoming message indicates the message is from a governmental agency or other public sector source.

As also seen in FIG. 2, in one embodiment, message analysis module 244 includes sending IP address analysis module 249 includes procedures, data, and/or instructions, for analyzing incoming messages to determine the geographical locations through which the incoming message passed, in one embodiment using the Classless Inter-Domain Routing (CIDR) associated with the connecting IP address or IP addresses within the received headers associated with the incoming e-mail. In one embodiment, sending IP address analysis module 249 includes procedures, data, and/or instructions, for attempting to find the origin, or earliest, sending IP address in an effort to determine the geographical location of the origin of the incoming message.

As also seen in FIG. 2, in one embodiment, message analysis module 244 includes compare sending IP address location and "From" address government module 251 that includes procedures, data, and/or instructions, for comparing the governmental "From" address, and determining the country associated with the governmental "From" address, and geographical locations through which the incoming message has passed, as indicated by the connecting IP address or IP addresses within the received headers associated with an incoming message, to determine the geographical locations through which the incoming e-mail has passed, to detect potential targeted malware containing messages having a spoofed governmental "From" address.

As also seen in FIG. 2, in one embodiment, message analysis module 244 includes protective action module 253 that includes procedures, data, and/or instructions, for taking one or more protective actions as discussed herein, and/or as known in the art at the time of filing, and/or as developed thereafter.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4 and FIG. 5.

Figure 3:
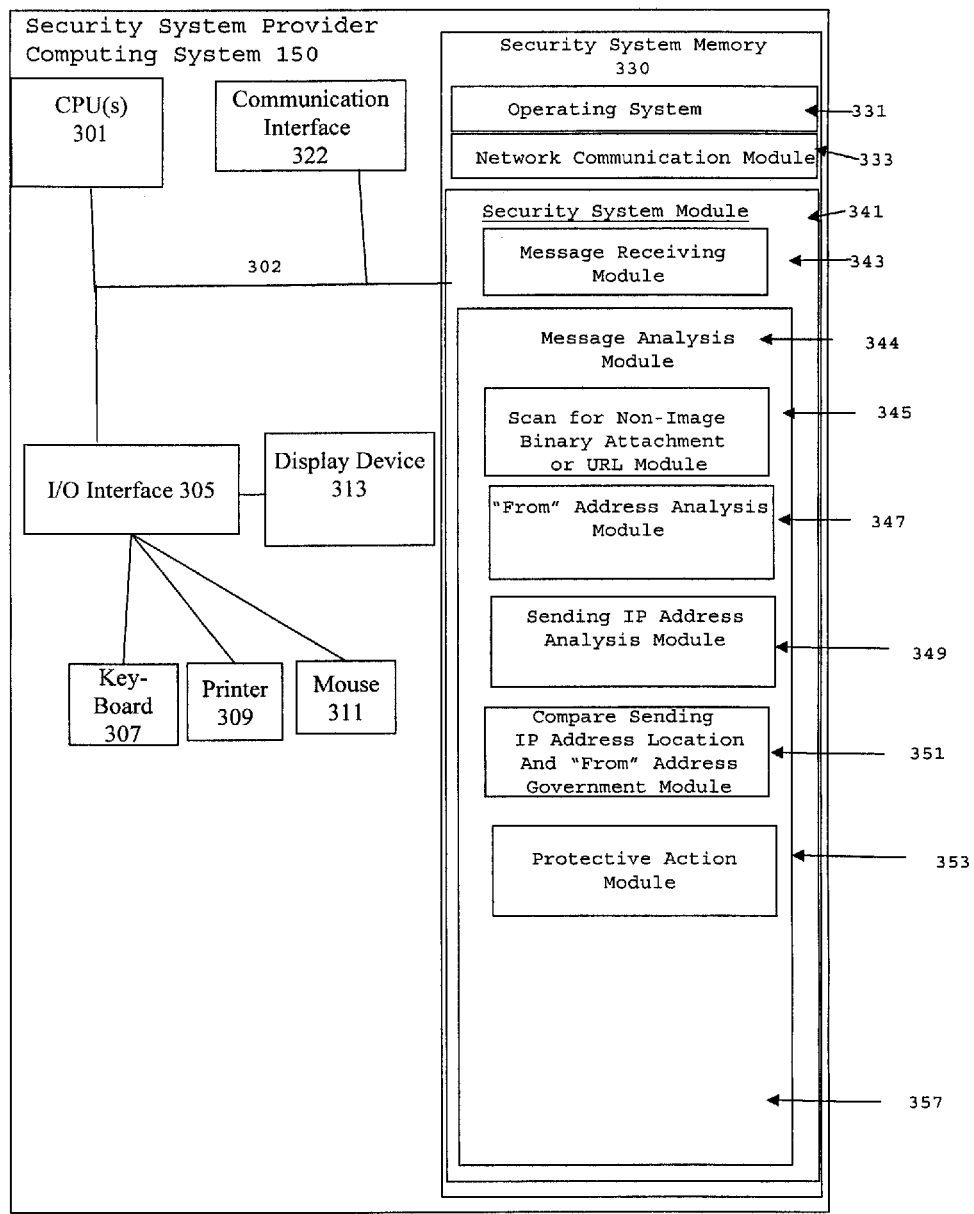
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and message analysis module 344 that includes procedures, data, and/or instructions for scanning e-mails, or other messages, being sent to, or through, user computing system(s) 100 and/or security system provider computing system 150 of FIG. 1 to identify malware and/or malware containing e-mails and to take one or more protective measures.

As also seen in FIG. 3, in one embodiment, security system module 341 of security system memory 330 includes: message receiving module 343 that includes procedures, data, and/or instructions for receiving messages sent to user computing system(s) 100 via security system provider computing system 150; and message analysis module 344 that includes procedures, data, and/or instructions for scanning e-mails, or other messages, being sent to user computing system(s) 100 through security system provider computing system 150 to identify malware and/or malware containing e-mails and to take one or more protective measures.

As also seen in FIG. 3, in one embodiment, message analysis module 344 includes scan for non-image binary attachment or URL module 345 that includes procedures, data, and/or instructions, for analyzing incoming messages in the live message stream to identify binary attachments or URLs attached to the incoming messages.

As also seen in FIG. 3, in one embodiment, message analysis module 344 includes "From" address analysis module 347 that includes procedures, data, and/or instructions, for analyzing incoming messages in a live message stream to determine if the "From" address of an incoming message indicates the message is from a governmental agency or other public sector source.

As also seen in FIG. 3, in one embodiment, message analysis module 344 includes sending IP address analysis module 349 that includes procedures, data, and/or instructions, for analyzing incoming messages to determine the geographical locations through which the incoming message passed, in one embodiment using the Classless Inter-Domain Routing (CIDR) associated with the connecting IP address or IP addresses within the received headers associated with the incoming e-mail. In one embodiment, sending IP address analysis module 349 includes procedures, data, and/or instructions, for attempting to find the origin, or earliest, sending IP addresses in an effort to determine the geographical location of the origin of the incoming message.

As also seen in FIG. 3, in one embodiment, message analysis module 344 includes compare sending IP address location and "From" address government module 351 that includes procedures, data, and/or instructions, for comparing the governmental "From" address, and determining the country associated with the governmental "From" address, and geographical locations through which the incoming message has passed, as indicated by the connecting IP address or IP addresses within the received headers associated with an incoming message, to determine the geographical locations through which the incoming e-mail has passed, to detect potential targeted malware containing messages having a spoofed governmental "From" address.

As also seen in FIG. 3, in one embodiment, message analysis module 344 includes protective action module 353 that includes procedures, data, and/or instructions, for taking one or more protective actions as discussed herein, and/or as known in the art at the time of filing, and/or as developed thereafter.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 341 of security system memory system 330 is provided below with respect to FIG. 4 and FIG. 5.

Referring to FIGS. 1, 2, 3, and 4, FIG. 4 is a flow chart depicting a process for detecting malware containing e-mails based on inconsistencies between a governmental agency "From" address and a sending IP address 400 in accordance with one embodiment.

Process for detecting malware containing e-mails based on inconsistencies between a governmental agency "From" address and a sending IP address 400 begins at ENTER OPERATION 401 and process flow proceeds to RECEIVE A MESSAGE OPERATION 402.

In one embodiment, at RECEIVE A MESSAGE OPERATION 402 one or more e-mails are received by a user computing system and/or a security system provider computing system.

In one embodiment, at RECEIVE A MESSAGE OPERATION 402 one or more e-mails are received at a user computing system, such as user computing system 100 of FIGS. 1 and 2, via a message receiving module, such as message receiving module 244 of FIG. 2, and/or a security system provider computing system, such as security system provider computing system 150 of FIGS. 1 and 3, via a message receiving module, such as message receiving module 344 of FIG. 3.

Figure 4:
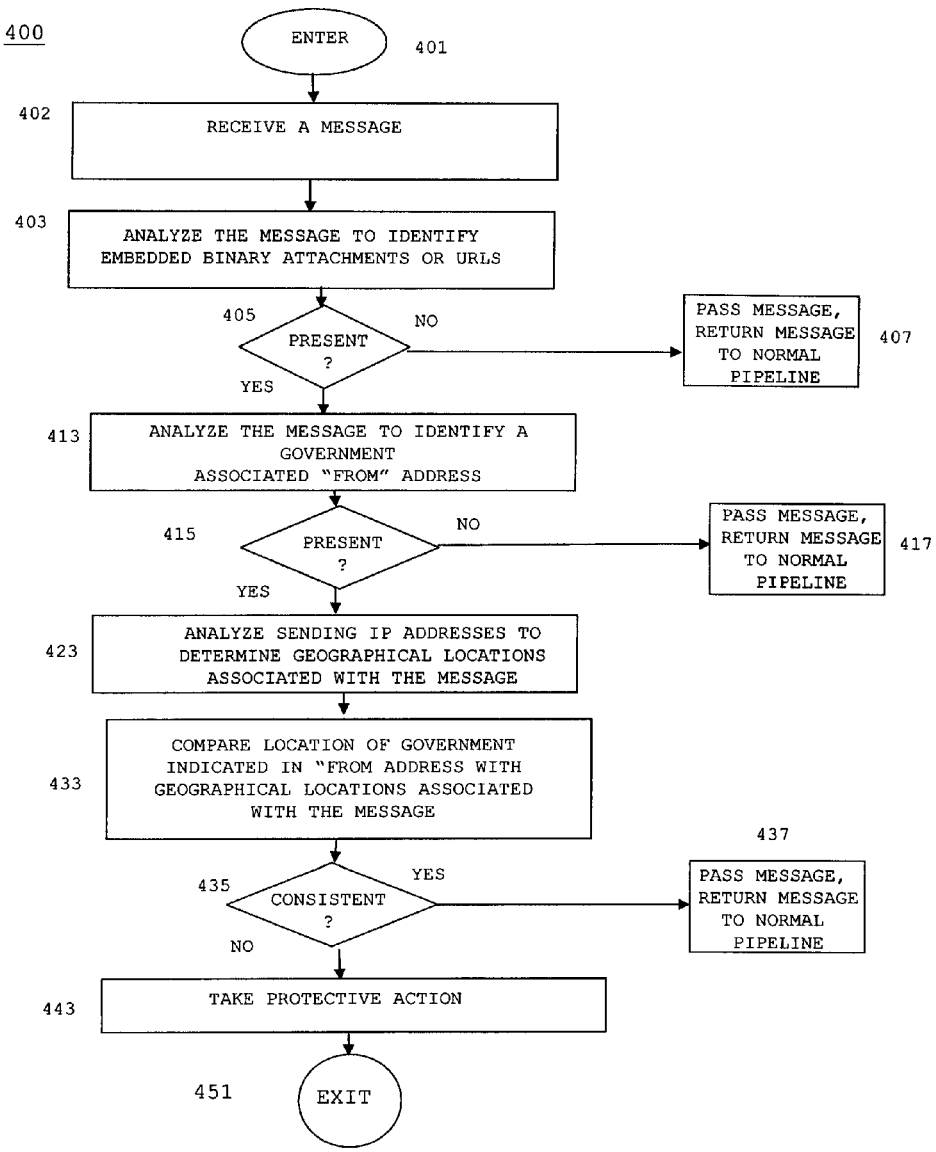
FIG. 4 is a flow chart depicting a process for detecting malware containing e-mails based on inconsistencies between a governmental agency "From" address and a sending IP address in accordance with one embodiment.

Returning the FIG. 4, in one embodiment, once one or more e-mails are received by a user computing system and/or a security system provider computing system at RECEIVE A MESSAGE OPERATION 402, process flow proceeds to ANALYZE THE MESSAGE TO IDENTIFY EMBEDDED BINARY ATTACHMENTS OR URLS OPERATION 403.

In one embodiment, at ANALYZE THE MESSAGE TO IDENTIFY EMBEDDED BINARY ATTACHMENTS OR URLS OPERATION 403 the e-mails received at RECEIVE A MESSAGE OPERATION 402 are initially scanned/filtered to identify embedded non-image binary attachments, URLs, or other elements indicative of malware.

In one embodiment, at ANALYZE THE MESSAGE TO IDENTIFY EMBEDDED BINARY ATTACHMENTS OR URLS OPERATION 403 the e-mails received at RECEIVE A MESSAGE OPERATION 402 are initially scanned/filtered to identify embedded non-image binary attachments, URLs, or other elements indicative of malware, using a scan for non-image binary attachment or URL module, such as scan for non-image binary attachment or URL module 245 of FIG. 2 and/or scan for non-image binary attachment or URL module 345 of FIG. 3 that includes procedures, data, and/or instructions, for analyzing incoming messages in the live message stream to identify binary attachments or URLs attached to the incoming messages.

In one embodiment, at ANALYZE THE MESSAGE TO IDENTIFY EMBEDDED BINARY ATTACHMENTS OR URLS OPERATION 403 the e-mails received at RECEIVE A MESSAGE OPERATION 402 are initially scanned/filtered by one or more processors, such as CPUs 201 of FIG. 2, and 301 of FIG. 3, associated with one or more computing systems, such as user computing system 100 of FIG. 2, and/or security system provider computing system 150 of FIG. 3, to separate potential malware containing e-mails from those that are deemed to be incapable of containing malware.

For instance, since malware distributed by e-mail typically takes the form of a non-image binary attachment to the e-mail, in one embodiment, at ANALYZE THE MESSAGE TO IDENTIFY EMBEDDED BINARY ATTACHMENTS OR URLS OPERATION 403, a heuristic is implemented by one or more processors associated with one or more computing systems that excludes all e-mails that are text only e-mails, and/or do not include binary attachments, and/or that have only image based binary attachments, from further processing by process for detecting malware containing e-mails based on inconsistencies between a governmental agency "From" address and a sending IP address 400.

In various embodiments, the implementation of the preliminary filtering at ANALYZE THE MESSAGE TO IDENTIFY EMBEDDED BINARY ATTACHMENTS OR URLS OPERATION 403 results in most non-malware containing e-mail, and a high proportion of legitimate e-mail, being by-passed to avoid processing costs and false positive results.

In one embodiment, at ANALYZE THE MESSAGE TO IDENTIFY EMBEDDED BINARY ATTACHMENTS OR URLS OPERATION 403, the remaining e-mails, i.e., those e-mails not filtered out, are considered possible malware containing e-mails, and are temporarily labeled and/or treated as potential malware containing e-mails although, in practice, the remaining e-mails are typically a mix of malware containing e-mails and legitimate e-mails.

In one embodiment, at ANALYZE THE MESSAGE TO IDENTIFY EMBEDDED BINARY ATTACHMENTS OR URLS OPERATION 403 e-mails that are not considered possible malware containing e-mails, such as those not having non-image binary attachments or URLs, are identified and filtered at PRESENT? OPERATION 405 and those yielding a "NO" result are passed back into the normal processing pipeline at PASS MESSAGE, RETURN MESSAGE TO NORMAL PIPELINE OPERATION 407.

In one embodiment, at ANALYZE THE MESSAGE TO IDENTIFY EMBEDDED BINARY ATTACHMENTS OR URLS OPERATION 403 e-mails that are considered possible malware containing e-mails, such as those having non-image binary attachments or URLs, are identified at PRESENT? OPERATION 405 and those yielding a "YES" result are forwarded for further processing by process for detecting malware containing e-mails based on inconsistencies between a governmental agency "From" address and a sending IP address 400.

The analysis of ANALYZE THE MESSAGE TO IDENTIFY EMBEDDED BINARY ATTACHMENTS OR URLS OPERATION 403 is optional. Consequently, in one embodiment, the analysis of ANALYZE THE MESSAGE TO IDENTIFY EMBEDDED BINARY ATTACHMENTS OR URLS OPERATION 403 is omitted and process for detecting malware containing e-mails based on inconsistencies between a governmental agency "From" address and a sending IP address 400 proceeds directly from RECEIVE A MESSAGE OPERATION 402 to ANALYZE THE MESSAGE TO IDENTIFY A GOVERNMENT ASSOCIATED "FROM" ADDRESS OPERATION 413.

In one embodiment, once the e-mails received at RECEIVE A MESSAGE OPERATION 402 are initially scanned/filtered to identify embedded non-image binary attachments, URLs, or other elements indicative of malware, at ANALYZE THE MESSAGE TO IDENTIFY EMBEDDED BINARY ATTACHMENTS OR URLS OPERATION 403, process flow proceeds to ANALYZE THE MESSAGE TO IDENTIFY A GOVERNMENT ASSOCIATED "FROM" ADDRESS OPERATION 413.

In one embodiment, at ANALYZE THE MESSAGE TO IDENTIFY A GOVERNMENT ASSOCIATED "FROM" ADDRESS OPERATION 413 an incoming e-mail of RECEIVE A MESSAGE OPERATION 402 is analyzed to determine if the incoming e-mail includes a "From" address having a domain suffix that is normally associated with a governmental agency, such as a .gov, .gov.uk, .go.jp, or any similar governmental domain suffix.

In one embodiment, at ANALYZE THE MESSAGE TO IDENTIFY A GOVERNMENT ASSOCIATED "FROM" ADDRESS OPERATION 413 an incoming e-mail of RECEIVE A MESSAGE OPERATION 402 is analyzed to determine if the incoming e-mail includes a "From" address having a domain suffix that is normally associated with a governmental agency, such as a .gov, .gov.uk, .go.jp, or any similar governmental domain suffix, using a "From" address analysis module, such as "From" address analysis module 247 of FIG. 2, and/or "From" address analysis module 347 of FIG. 3 that includes procedures, data, and/or instructions, for analyzing incoming messages in a live message stream to determine if the "From" address of an incoming message indicates the message is from a governmental agency or other public sector source.

In one embodiment, at ANALYZE THE MESSAGE TO IDENTIFY A GOVERNMENT ASSOCIATED "FROM" ADDRESS OPERATION 413 an incoming e-mail of RECEIVE A MESSAGE OPERATION 402 is analyzed to determine if the incoming e-mail includes a "From" address having a domain suffix that is normally associated with a governmental agency, such as a .gov, .gov.uk, .go.jp, or any similar governmental domain suffix, using one or more processors, such as CPUs 201 of FIG. 2, and 301 of FIG. 3, associated with one or more computing systems, such as user computing system 100 of FIG. 2, and/or security system provider computing system 150 of FIG. 3.

In one embodiment, at ANALYZE THE MESSAGE TO IDENTIFY A GOVERNMENT ASSOCIATED "FROM" ADDRESS OPERATION 413 a filter is implemented by one or more processors associated with one or more computing systems that excludes all e-mails that do not include a "From" address having a domain suffix that is normally associated with a governmental agency, such as a .gov, .gov.uk, .go.jp, or any similar governmental domain suffix, from further processing by process for detecting malware containing e-mails based on inconsistencies between a governmental agency "From" address and a sending IP address 400.

In one embodiment, at ANALYZE THE MESSAGE TO IDENTIFY A GOVERNMENT ASSOCIATED "FROM" ADDRESS OPERATION 413, the remaining e-mails, i.e., those e-mails having a "From" address having a domain suffix that is normally associated with a governmental agency, such as a .gov, .gov.uk, .go.jp, or any similar governmental domain suffix, are considered possible malware containing e-mails, and are temporarily labeled and/or treated as potential malware containing e-mails although, in practice, the remaining e-mails are typically a mix of malware containing e-mails and legitimate e-mails.

In one embodiment, at ANALYZE THE MESSAGE TO IDENTIFY A GOVERNMENT ASSOCIATED "FROM" ADDRESS OPERATION 413 e-mails that do not include a "From" address having a domain suffix that is normally associated with a governmental agency, such as a .gov, .gov.uk, .go.jp, or any similar governmental domain suffix, are identified at PRESENT? OPERATION 415 and those yielding a "NO" result are passed back into the normal processing pipeline at PASS MESSAGE, RETURN MESSAGE TO NORMAL PIPELINE OPERATION 417.

In one embodiment, at ANALYZE THE MESSAGE TO IDENTIFY A GOVERNMENT ASSOCIATED "FROM" ADDRESS OPERATION 413 e-mails that do include a "From" address having a domain suffix that is normally associated with a governmental agency, such as a .gov, .gov.uk, .go.jp, or any similar governmental domain suffix, are identified at PRESENT? OPERATION 415, and those yielding a "YES" result are forwarded for further processing by process for detecting malware containing e-mails based on inconsistencies between a governmental agency "From" address and a sending IP address 400.

In one embodiment, at ANALYZE THE MESSAGE TO IDENTIFY A GOVERNMENT ASSOCIATED "FROM" ADDRESS OPERATION 413 e-mails that do include a "From" address having a domain suffix that is normally associated with a governmental agency, such as a .gov, .gov.uk, .go.jp, or any similar governmental domain suffix, are further analyzed to determine the country associated with the "From" address having a domain suffix that is normally associated with a governmental agency.

In one embodiment, once an incoming e-mail of RECEIVE A MESSAGE OPERATION 402 is analyzed to determine if the incoming e-mail includes a "From" address having a domain suffix that is normally associated with a governmental agency, such as a .gov, .gov.uk, .go.jp, or any similar governmental domain suffix, at ANALYZE THE MESSAGE TO IDENTIFY A GOVERNMENT ASSOCIATED "FROM" ADDRESS OPERATION 413, process flow proceeds to ANALYZE SENDING IP ADDRESSES TO DETERMINE GEOGRAPHICAL LOCATIONS ASSOCIATED WITH THE MESSAGE OPERATION 423.

In one embodiment, at ANALYZE SENDING IP ADDRESSES TO DETERMINE GEOGRAPHICAL LOCATIONS ASSOCIATED WITH THE MESSAGE OPERATION 423 the e-mail determined to have a "From" address having a governmental domain suffix of ANALYZE THE MESSAGE TO IDENTIFY A GOVERNMENT ASSOCIATED "FROM" ADDRESS OPERATION 413 is analyzed to determine the connecting IP address or IP addresses within the received headers associated with the e-mail and these sending IP addresses associated with the e-mail are analyzed to determine the geographical locations through which the incoming e-mail passed.

In one embodiment, at ANALYZE SENDING IP ADDRESSES TO DETERMINE GEOGRAPHICAL LOCATIONS ASSOCIATED WITH THE MESSAGE OPERATION 423 the connecting IP address or IP addresses within the received headers associated with the e-mail of RECEIVE A MESSAGE OPERATION 402 are analyzed to determine the geographical locations through which the e-mail passed using the Classless Inter-Domain Routing (CIDR) associated with these sending IP addresses associated with the incoming e-mail.

In one embodiment, at ANALYZE SENDING IP ADDRESSES TO DETERMINE GEOGRAPHICAL LOCATIONS ASSOCIATED WITH THE MESSAGE OPERATION 423 an attempt is made to find the original, or earliest, sending IP address of the e-mail determined to have a "From" address having a governmental domain suffix of ANALYZE THE MESSAGE TO IDENTIFY A GOVERNMENT ASSOCIATED "FROM" ADDRESS OPERATION 413 in an effort to determine the geographical location of the origin of the incoming e-mail.

In one embodiment, at ANALYZE SENDING IP ADDRESSES TO DETERMINE GEOGRAPHICAL LOCATIONS ASSOCIATED WITH THE MESSAGE OPERATION 423 the e-mail determined to have a "From" address having a governmental domain suffix of ANALYZE THE MESSAGE TO IDENTIFY A GOVERNMENT ASSOCIATED "FROM" ADDRESS OPERATION 413 is analyzed to determine the connecting IP address or IP addresses within the received headers associated with the e-mail and these sending IP addresses associated with the e-mail are analyzed to determine the geographical locations through which the incoming e-mail passed using a sending IP address analysis module, such as sending IP address analysis module 249 of FIG. 2, and/or sending IP address analysis module 249 of FIG. 3, that includes procedures, data, and/or instructions, for analyzing incoming messages to determine the geographical locations through which the incoming message passed, in one embodiment using the Classless Inter-Domain Routing (CIDR) associated with the connecting IP address or IP addresses within the received headers associated with the incoming e-mail.

In one embodiment, at ANALYZE SENDING IP ADDRESSES TO DETERMINE GEOGRAPHICAL LOCATIONS ASSOCIATED WITH THE MESSAGE OPERATION 423 the e-mail determined to have a "From" address having a governmental domain suffix of ANALYZE THE MESSAGE TO IDENTIFY A GOVERNMENT ASSOCIATED "FROM" ADDRESS OPERATION 413 is analyzed to determine the connecting IP address or IP addresses within the received headers associated with the e-mail and these sending IP addresses associated with the e-mail are analyzed to determine the geographical locations through which the incoming e-mail passed using one or more processors, such as CPUs 201 of FIG. 2, and 301 of FIG. 3, associated with one or more computing systems, such as user computing system 100 of FIG. 2, and/or security system provider computing system 150 of FIG. 3.

In one embodiment, once the e-mail determined to have a "From" address having a governmental domain suffix of ANALYZE THE MESSAGE TO IDENTIFY A GOVERNMENT ASSOCIATED "FROM" ADDRESS OPERATION 413 is analyzed to determine the connecting IP address or IP addresses within the received headers associated with the e-mail and these sending IP addresses associated with the e-mail are analyzed to determine the geographical locations through which the incoming e-mail passed at ANALYZE SENDING IP ADDRESSES TO DETERMINE GEOGRAPHICAL LOCATIONS ASSOCIATED WITH THE MESSAGE OPERATION 423, process flow proceeds to COMPARE LOCATION OF GOVERNMENT INDICATED IN THE "FROM" ADDRESS WITH GEOGRAPHICAL LOCATIONS ASSOCIATED WITH THE MESSAGE OPERATION 433.

In one embodiment, at COMPARE LOCATION OF GOVERNMENT INDICATED IN THE "FROM" ADDRESS WITH GEOGRAPHICAL LOCATIONS ASSOCIATED WITH THE MESSAGE OPERATION 433 the geographical locations associated with the connecting IP address or IP addresses within the received headers of the e-mail of ANALYZE SENDING IP ADDRESSES TO DETERMINE GEOGRAPHICAL LOCATIONS ASSOCIATED WITH THE MESSAGE OPERATION 423 are compared with the country indicated by the domain suffix in the governmental "From" address of the e-mail of ANALYZE THE MESSAGE TO IDENTIFY A GOVERNMENT ASSOCIATED "FROM" ADDRESS OPERATION 413.

In one embodiment, at COMPARE LOCATION OF GOVERNMENT INDICATED IN THE "FROM" ADDRESS WITH GEOGRAPHICAL LOCATIONS ASSOCIATED WITH THE MESSAGE OPERATION 433 the geographical locations associated with the connecting IP address or IP addresses within the received headers of the e-mail of ANALYZE SENDING IP ADDRESSES TO DETERMINE GEOGRAPHICAL LOCATIONS ASSOCIATED WITH THE MESSAGE OPERATION 423 are compared with the country indicated by the domain suffix in the governmental "From" address of the e-mail of ANALYZE THE MESSAGE TO IDENTIFY A GOVERNMENT ASSOCIATED "FROM" ADDRESS OPERATION 413 using a compare sending IP address location and "From" address government module, such as compare sending IP address location and "From" address government module 251 of FIG. 2 and/or compare sending IP address location and "From" address government module 251 of FIG. 3, that includes procedures, data, and/or instructions, for comparing the governmental "From" address, and determining the country associated with the governmental "From" address, and geographical locations through which the incoming message has passed, as indicated by the sending IP addresses associated with an incoming message, to determine the geographical locations through which the incoming e-mail has passed, to detect potential targeted malware containing messages having a spoofed governmental "From" address.

In one embodiment, at COMPARE LOCATION OF GOVERNMENT INDICATED IN THE "FROM" ADDRESS WITH GEOGRAPHICAL LOCATIONS ASSOCIATED WITH THE MESSAGE OPERATION 433 the geographical locations associated with the sending IP addresses of the e-mail of ANALYZE SENDING IP ADDRESSES TO DETERMINE GEOGRAPHICAL LOCATIONS ASSOCIATED WITH THE MESSAGE OPERATION 423 are compared with the country indicated by the domain suffix in the governmental "From" address of the e-mail of ANALYZE THE MESSAGE TO IDENTIFY A GOVERNMENT ASSOCIATED "FROM" ADDRESS OPERATION 413 using one or more processors, such as CPUs 201 of FIG. 2, and 301 of FIG. 3, associated with one or more computing systems, such as user computing system 100 of FIG. 2, and/or security system provider computing system 150 of FIG. 3.

As noted above, most legitimate governmental agency e-mails are sent from the country indicated by the governmental "From" address. For instance, an e-mail having a "From" address ending in ".gov", indicating the e-mail is from a United States government agency source, would be expected to originate, and/or connect through, locations in the United States, or a small set of other locations. Likewise, an e-mail having a "From" address ending in ".gov.uk", indicating the e-mail is from a United Kingdom government agency source, should originate, and/or connect through, locations in the United Kingdom, or a small set of other locations. Similarly, it would be expected that an e-mail having a "From" address ending in ".go.jp", indicating the e-mail is from a Japanese government agency source should originate, and/or connect through, locations in Japan.

Consequently, in one embodiment, if the geographical locations associated with the sending IP addresses of the e-mail of ANALYZE SENDING IP ADDRESSES TO DETERMINE GEOGRAPHICAL LOCATIONS ASSOCIATED WITH THE MESSAGE OPERATION 423 are not consistent with the country indicated by the domain suffix in the governmental "From" address of the e-mail of ANALYZE THE MESSAGE TO IDENTIFY A GOVERNMENT ASSOCIATED "FROM" ADDRESS OPERATION 413, i.e., at CONSISTENT ? OPERATION 435 the result is "NO", data indicating the status of the e-mail is transformed to indicate the e-mail is a potential targeted malware risk and the e-mail is forwarded to TAKE PROTECTIVE ACTION OPERATION 443.

On the other hand, in one embodiment, if the geographical locations associated with the sending IP addresses of the e-mail of ANALYZE SENDING IP ADDRESSES TO DETERMINE GEOGRAPHICAL LOCATIONS ASSOCIATED WITH THE MESSAGE OPERATION 423 are consistent with the country indicated by the domain suffix in the governmental "From" address of the e-mail of ANALYZE THE MESSAGE TO IDENTIFY A GOVERNMENT ASSOCIATED "FROM" ADDRESS OPERATION 413, i.e., at CONSISTENT ? OPERATION 435 the result is "YES", the e-mail is removed from further processing by process for detecting malware containing e-mails based on inconsistencies between a governmental agency "From" address and a sending IP address 400 at PASS MESSAGE, RETURN MESSAGE TO NORMAL PIPELINE OPERATION 437.

In one embodiment, once the geographical locations associated with the sending IP addresses of the e-mail of ANALYZE SENDING IP ADDRESSES TO DETERMINE GEOGRAPHICAL LOCATIONS ASSOCIATED WITH THE MESSAGE OPERATION 423 are compared with the country indicated by the domain suffix in the governmental "From" address of the e-mail of ANALYZE THE MESSAGE TO IDENTIFY A GOVERNMENT ASSOCIATED "FROM" ADDRESS OPERATION 413 at COMPARE LOCATION OF GOVERNMENT INDICATED IN THE "FROM" ADDRESS WITH GEOGRAPHICAL LOCATIONS ASSOCIATED WITH THE MESSAGE OPERATION 433 the e-mails whose status data was transformed to indicate the e-mails were a potential targeted malware risk are forwarded to TAKE PROTECTIVE ACTION OPERATION 443.

In one embodiment, at TAKE PROTECTIVE ACTION OPERATION 443 protective action is taken against the e-mail of RECEIVE A MESSAGE OPERATION 402 determined to be a potential targeted malware risk including, but not limited to any one or more of: blocking the e-mail; flagging the e-mail as suspect and alerting the recipient; performing further analysis on the e-mail; or any other form of protective action as discussed herein, and/or as known in the art at the time of filing, and/or as developed after the time of filing.

In one embodiment, once protective action is taken against the e-mail of RECEIVE A MESSAGE OPERATION 402 determined to be a potential targeted malware risk at TAKE PROTECTIVE ACTION OPERATION 443, process flow proceeds to EXIT OPERATION 451 where process for detecting malware containing e-mails based on inconsistencies between a governmental agency "From" address and a sending IP address 400 is exited to await new data.

Using process for detecting malware containing e-mails based on inconsistencies between a governmental agency "From" address and a sending IP address 400, the country indicated by the governmental "From" address, and the connecting IP address or IP addresses within the received headers associated with an incoming e-mail are analyzed and, if the geographical locations associated with these sending IP addresses of the incoming e-mail are not consistent with the country indicated by the domain suffix in the governmental "From" address of the incoming e-mail, one or more protective actions are taken to block the identified potential targeted malware attack. Therefore, process for detecting malware containing e-mails based on inconsistencies between a governmental agency "From" address and a sending IP address 400 provides a mechanism to potentially thwart this serious threat to public sector data that is unavailable using current detection systems.

In one embodiment, the country indicated by the governmental "From" address and the sending IP addresses associated with an incoming e-mail are analyzed and if the CIDR associated with the connecting IP address or IP addresses within the received headers associated with the incoming e-mail are known to have previously been associated with targeted malware, one or more protective actions are taken to block the identified potential targeted malware attack.

Referring to FIGS. 1, 2, 3, and 5, FIG. 5 is a flow chart depicting a process for detecting malware containing e-mails based on inconsistencies between a governmental agency "From" address and a sending IP address 500 in accordance with one embodiment.

Process for detecting malware containing e-mails based on inconsistencies between a governmental agency "From" address and a sending IP address 500 begins at ENTER OPERATION 501 and process flow proceeds to RECEIVE A MESSAGE OPERATION 502.

In one embodiment, at RECEIVE A MESSAGE OPERATION 502 one or more e-mails are received by a user computing system and/or a security system provider computing system.

In one embodiment, at RECEIVE A MESSAGE OPERATION 502 one or more e-mails are received at a user computing system, such as user computing system 100 of FIGS. 1 and 2, via a message receiving module, such as message receiving module 244 of FIG. 2, and/or a security system provider computing system, such as security system provider computing system 150 of FIGS. 1 and 3, via a message receiving module, such as message receiving module 344 of FIG. 3.

Figure 5:
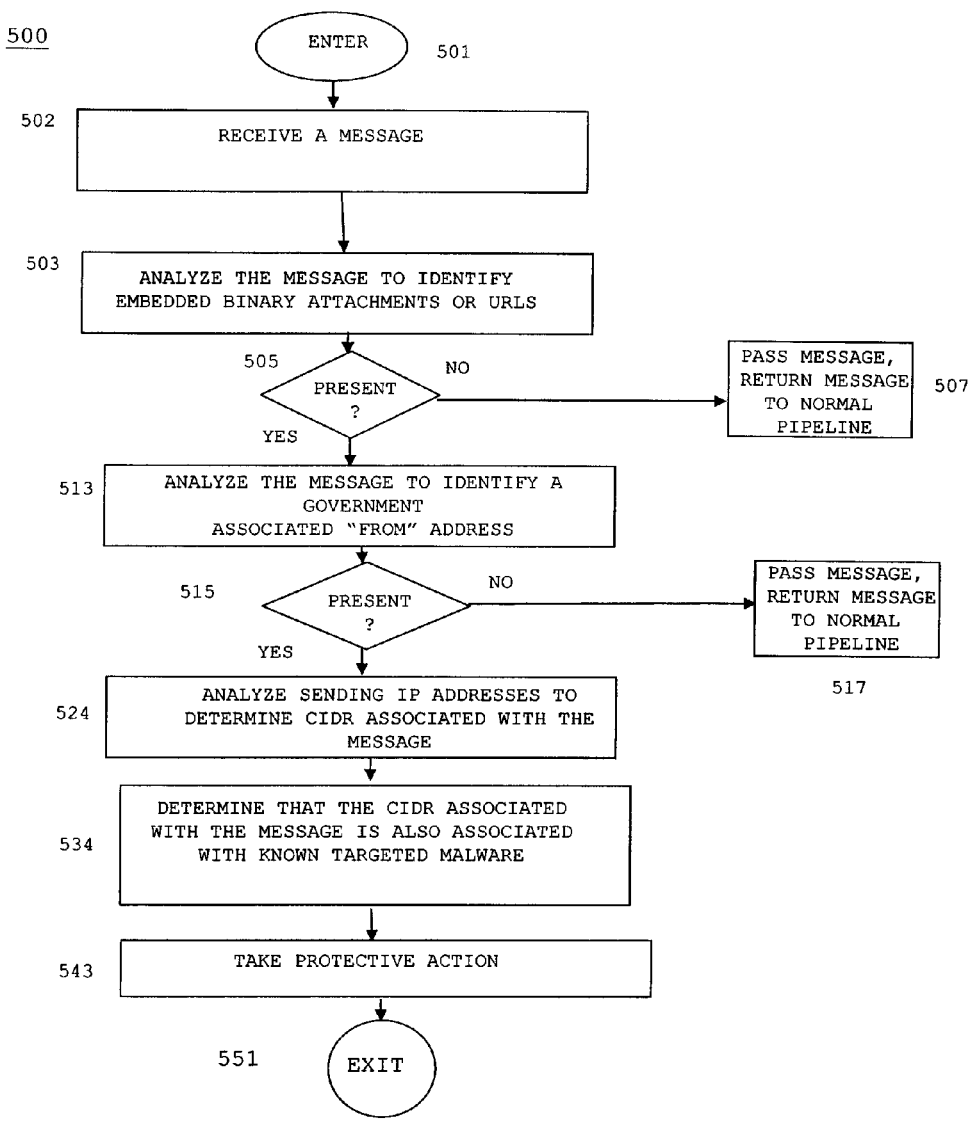
FIG. 5 is a flow chart depicting a process for detecting malware containing e-mails based on inconsistencies between a governmental agency "From" address and a sending IP address in accordance with one embodiment.

Returning the FIG. 5, in one embodiment, once one or more e-mails are received by a user computing system and/or a security system provider computing system at RECEIVE A MESSAGE OPERATION 502, process flow proceeds to ANALYZE THE MESSAGE TO IDENTIFY EMBEDDED BINARY ATTACHMENTS OR URLS OPERATION 503.

In one embodiment, at ANALYZE THE MESSAGE TO IDENTIFY EMBEDDED BINARY ATTACHMENTS OR URLS OPERATION 503 the e-mails received at RECEIVE A MESSAGE OPERATION 502 are initially scanned/filtered to identify embedded non-image binary attachments, URLs, or other elements indicative of malware.

In one embodiment, at ANALYZE THE MESSAGE TO IDENTIFY EMBEDDED BINARY ATTACHMENTS OR URLS OPERATION 503 the e-mails received at RECEIVE A MESSAGE OPERATION 502 are initially scanned/filtered to identify embedded non-image binary attachments, URLs, or other elements indicative of malware using a scan for non-image binary attachment or URL module, such as scan for non-image binary attachment or URL module 245 of FIG. 2 and/or scan for non-image binary attachment or URL module 345 of FIG. 3 that includes procedures, data, and/or instructions, for analyzing incoming messages in the live message stream to identify binary attachments or URLs attached to the incoming messages.

In one embodiment, at ANALYZE THE MESSAGE TO IDENTIFY EMBEDDED BINARY ATTACHMENTS OR URLS OPERATION 503 the e-mails received at RECEIVE A MESSAGE OPERATION 502 are initially scanned/filtered by one or more processors, such as CPUs 201 of FIG. 2, and 301 of FIG. 3, associated with one or more computing systems, such as user computing system 100 of FIG. 2, and/or security system provider computing system 150 of FIG. 3, to separate potential malware containing e-mails from those that are deemed to be incapable of containing malware.

For instance, since malware distributed by e-mail typically takes the form of a non-image binary attachment to the e-mail, in one embodiment, at ANALYZE THE MESSAGE TO IDENTIFY EMBEDDED BINARY ATTACHMENTS OR URLS OPERATION 503, a heuristic is implemented by one or more processors associated with one or more computing systems that excludes all e-mails that are text only e-mails, and/or do not include binary attachments, and/or that have only image based binary attachments, from further processing by process for detecting malware containing e-mails based on inconsistencies between a governmental agency "From" address and a sending IP address 500.

In various embodiments, the implementation of the preliminary filtering at ANALYZE THE MESSAGE TO IDENTIFY EMBEDDED BINARY ATTACHMENTS OR URLS OPERATION 503 results in most non-malware containing e-mail, and a high proportion of legitimate e-mail, being by-passed to avoid processing costs and false positive results.

In one embodiment, at ANALYZE THE MESSAGE TO IDENTIFY EMBEDDED BINARY ATTACHMENTS OR URLS OPERATION 503, the remaining e-mails, i.e., those e-mails not filtered out, are considered possible malware containing e-mails, and are temporarily labeled and/or treated as potential malware containing e-mails although, in practice, the remaining e-mails are typically a mix of malware containing e-mails and legitimate e-mails.

In one embodiment, at ANALYZE THE MESSAGE TO IDENTIFY EMBEDDED BINARY ATTACHMENTS OR URLS OPERATION 503 e-mails that are not considered possible malware containing e-mails, such as those not having non-image binary attachments or URLs, are identified and filtered at PRESENT? OPERATION 505 and those yielding a "NO" result are passed back into the normal processing pipeline at PASS MESSAGE, RETURN MESSAGE TO NORMAL PIPELINE OPERATION 507.

In one embodiment, at ANALYZE THE MESSAGE TO IDENTIFY EMBEDDED BINARY ATTACHMENTS OR URLS OPERATION 503 e-mails that are considered possible malware containing e-mails, such as those having non-image binary attachments or URLs, are identified at PRESENT? OPERATION 505 and those yielding a "YES" result are forwarded for further processing by process for detecting malware containing e-mails based on inconsistencies between a governmental agency "From" address and a sending IP address 500.

The analysis of ANALYZE THE MESSAGE TO IDENTIFY EMBEDDED BINARY ATTACHMENTS OR URLS OPERATION 503 is optional. Consequently, in one embodiment, the analysis of ANALYZE THE MESSAGE TO IDENTIFY EMBEDDED BINARY ATTACHMENTS OR URLS OPERATION 503 is omitted and process for detecting malware containing e-mails based on inconsistencies between a governmental agency "From" address and a sending IP address 500 proceeds directly from RECEIVE A MESSAGE OPERATION 502 to ANALYZE THE MESSAGE TO IDENTIFY A GOVERNMENT ASSOCIATED "FROM" ADDRESS OPERATION 513.

In one embodiment, once the e-mails received at RECEIVE A MESSAGE OPERATION 502 are initially scanned/filtered to identify embedded non-image binary attachments, URLs, or other elements indicative of malware, at ANALYZE THE MESSAGE TO IDENTIFY EMBEDDED BINARY ATTACHMENTS OR URLS OPERATION 503, process flow proceeds to ANALYZE THE MESSAGE TO IDENTIFY A GOVERNMENT ASSOCIATED "FROM" ADDRESS OPERATION 513.

In one embodiment, at ANALYZE THE MESSAGE TO IDENTIFY A GOVERNMENT ASSOCIATED "FROM" ADDRESS OPERATION 513 an incoming e-mail of RECEIVE A MESSAGE OPERATION 502 is analyzed to determine if the incoming e-mail includes a "From" address having a domain suffix that is normally associated with a governmental agency, such as a .gov, .gov.uk, .go.jp, or any similar governmental domain suffix.

In one embodiment, at ANALYZE THE MESSAGE TO IDENTIFY A GOVERNMENT ASSOCIATED "FROM" ADDRESS OPERATION 513 an incoming e-mail of RECEIVE A MESSAGE OPERATION 502 is analyzed to determine if the incoming e-mail includes a "From" address having a domain suffix that is normally associated with a governmental agency, such as a .gov, .gov.uk, .go.jp, or any similar governmental domain suffix, using a "From" address analysis module, such as "From" address analysis module 247 of FIG. 2, and/or "From" address analysis module 347 of FIG. 3 that includes procedures, data, and/or instructions, for analyzing incoming messages in a live message stream to determine if the "From" address of an incoming message indicates the message is from a governmental agency or other public sector source.

In one embodiment, at ANALYZE THE MESSAGE TO IDENTIFY A GOVERNMENT ASSOCIATED "FROM" ADDRESS OPERATION 513 an incoming e-mail of RECEIVE A MESSAGE OPERATION 502 is analyzed to determine if the incoming e-mail includes a "From" address having a domain suffix that is normally associated with a governmental agency, such as a .gov, .gov.uk, .go.jp, or any similar governmental domain suffix, using one or more processors, such as CPUs 201 of FIG. 2, and 301 of FIG. 3, associated with one or more computing systems, such as user computing system 100 of FIG. 2, and/or security system provider computing system 150 of FIG. 3.

In one embodiment, at ANALYZE THE MESSAGE TO IDENTIFY A GOVERNMENT ASSOCIATED "FROM" ADDRESS OPERATION 513 a filter is implemented by one or more processors associated with one or more computing systems that excludes all e-mails that do not include a "From" address having a domain suffix that is normally associated with a governmental agency, such as a .gov, .gov.uk, .go.jp, or any similar governmental domain suffix, from further processing by process for detecting malware containing e-mails based on inconsistencies between a governmental agency "From" address and a sending IP address 500.

In one embodiment, at ANALYZE THE MESSAGE TO IDENTIFY A GOVERNMENT ASSOCIATED "FROM" ADDRESS OPERATION 513, the remaining e-mails, i.e., those e-mails having a "From" address having a domain suffix that is normally associated with a governmental agency, such as a .gov, .gov.uk, .go.jp, or any similar governmental domain suffix, are considered possible malware containing e-mails, and are temporarily labeled and/or treated as potential malware containing e-mails although, in practice, the remaining e-mails are typically a mix of malware containing e-mails and legitimate e-mails.

In one embodiment, at ANALYZE THE MESSAGE TO IDENTIFY A GOVERNMENT ASSOCIATED "FROM" ADDRESS OPERATION 513 e-mails that do not include a "From" address having a domain suffix that is normally associated with a governmental agency, such as a .gov, .gov.uk, .go.jp, or any similar governmental domain suffix, are identified at PRESENT? OPERATION 515 and those yielding a "NO" result are passed back into the normal processing pipeline at PASS MESSAGE, RETURN MESSAGE TO NORMAL PIPELINE OPERATION 517.

In one embodiment, at ANALYZE THE MESSAGE TO IDENTIFY A GOVERNMENT ASSOCIATED "FROM" ADDRESS OPERATION 513 e-mails that do include a "From" address having a domain suffix that is normally associated with a governmental agency, such as a .gov, .gov.uk, .go.jp, or any similar governmental domain suffix, are identified at PRESENT? OPERATION 515, and those yielding a "YES" result are forwarded for further processing by process for detecting malware containing e-mails based on inconsistencies between a governmental agency "From" address and a sending IP address 500.

In one embodiment, at ANALYZE THE MESSAGE TO IDENTIFY A GOVERNMENT ASSOCIATED "FROM" ADDRESS OPERATION 513 e-mails that do include a "From" address having a domain suffix that is normally associated with a governmental agency, such as a .gov, .gov.uk, .go.jp, or any similar governmental domain suffix, are further analyzed to determine the country associated with the "From" address having a domain suffix that is normally associated with a governmental agency.

In one embodiment, once an incoming e-mail of RECEIVE A MESSAGE OPERATION 502 is analyzed to determine if the incoming e-mail includes a "From" address having a domain suffix that is normally associated with a governmental agency, such as a .gov, .gov.uk, .go.jp, or any similar governmental domain suffix, at ANALYZE THE MESSAGE TO IDENTIFY A GOVERNMENT ASSOCIATED "FROM" ADDRESS OPERATION 513, process flow proceeds to ANALYZE SENDING IP ADDRESSES TO DETERMINE CIDR ASSOCIATED WITH THE MESSAGE OPERATION 524.

In one embodiment, at ANALYZE SENDING IP ADDRESSES TO DETERMINE CIDR ASSOCIATED WITH THE MESSAGE OPERATION 524 the e-mail determined to have a "From" address having a governmental domain suffix of ANALYZE THE MESSAGE TO IDENTIFY A GOVERNMENT ASSOCIATED "FROM" ADDRESS OPERATION 513 is analyzed to determine the connecting IP address or IP addresses within the received headers associated with the e-mail.

In one embodiment, at ANALYZE SENDING IP ADDRESSES TO DETERMINE CIDR ASSOCIATED WITH THE MESSAGE OPERATION 524 the connecting IP address or IP addresses within the received headers associated with the e-mail of RECEIVE A MESSAGE OPERATION 502 are analyzed to determine the Classless Inter-Domain Routing (CIDR) associated with the connecting IP address or IP addresses within the received headers associated with the incoming e-mail.

In one embodiment, at ANALYZE SENDING IP ADDRESSES TO DETERMINE CIDR ASSOCIATED WITH THE MESSAGE OPERATION 524 an attempt is made to find the origin, or earliest, sending IP addresses of the e-mail determined to have a "From" address having a governmental domain suffix of ANALYZE THE MESSAGE TO IDENTIFY A GOVERNMENT ASSOCIATED "FROM" ADDRESS OPERATION 513 in an effort to determine the origin of the incoming e-mail.

In one embodiment, at ANALYZE SENDING IP ADDRESSES TO DETERMINE CIDR ASSOCIATED WITH THE MESSAGE OPERATION 524 the e-mail determined to have a "From" address having a governmental domain suffix of ANALYZE THE MESSAGE TO IDENTIFY A GOVERNMENT ASSOCIATED "FROM" ADDRESS OPERATION 513 is analyzed to determine the connecting IP address or IP addresses within the received headers associated with the e-mail using a sending IP address analysis module, such as sending IP address analysis module 249 of FIG. 2, and/or sending IP address analysis module 249 of FIG. 3, that includes procedures, data, and/or instructions, for analyzing incoming messages to determine the Classless Inter-Domain Routing (CIDR) associated with the connecting IP address or IP addresses within the received headers associated with the incoming e-mail.

In one embodiment, at ANALYZE SENDING IP ADDRESSES TO DETERMINE CIDR ASSOCIATED WITH THE MESSAGE OPERATION 524 the e-mail determined to have a "From" address having a governmental domain suffix of ANALYZE THE MESSAGE TO IDENTIFY A GOVERNMENT ASSOCIATED "FROM" ADDRESS OPERATION 513 is analyzed to determine the connecting IP address or IP addresses within the received headers associated with the e-mail using one or more processors, such as CPUs 201 of FIG. 2, and 301 of FIG. 3, associated with one or more computing systems, such as user computing system 100 of FIG. 2, and/or security system provider computing system 150 of FIG. 3.

In one embodiment, once the e-mail determined to have a "From" address having a governmental domain suffix of ANALYZE THE MESSAGE TO IDENTIFY A GOVERNMENT ASSOCIATED "FROM" ADDRESS OPERATION 513 is analyzed to determine the connecting IP address or IP addresses within the received headers associated with the e-mail at ANALYZE SENDING IP ADDRESSES TO DETERMINE CIDR ASSOCIATED WITH THE MESSAGE OPERATION 524, process flow proceeds to DETERMINE THAT THE CIDR ASSOCIATED WITH THE MESSAGE IS ALSO ASSOCIATED WITH KNOWN TARGETED MALWARE 534.

In one embodiment, at DETERMINE THAT THE CIDR ASSOCIATED WITH THE MESSAGE IS ALSO ASSOCIATED WITH KNOWN TARGETED MALWARE 534 a determination is made that the CIDR associated with the connecting IP address or IP addresses within the received headers associated with the e-mail of RECEIVE A MESSAGE OPERATION 502 are historically associated with previously sent targeted malware.

In one embodiment, at DETERMINE THAT THE CIDR ASSOCIATED WITH THE MESSAGE IS ALSO ASSOCIATED WITH KNOWN TARGETED MALWARE 534 a determination is made that the CIDR associated with the connecting IP address or IP addresses within the received headers associated with the e-mail of RECEIVE A MESSAGE OPERATION 502 are historically associated with previously sent targeted malware using a database, such as database 170 of FIG. 1, that includes data indicating CIDR of sending IP addresses that have been found to historically be associated with previously sent targeted malware.

In one embodiment, at DETERMINE THAT THE CIDR ASSOCIATED WITH THE MESSAGE IS ALSO ASSOCIATED WITH KNOWN TARGETED MALWARE 534 a determination is made that the CIDR associated with the connecting IP address or IP addresses within the received headers associated with the e-mail of RECEIVE A MESSAGE OPERATION 502 are historically associated with previously sent targeted malware using one or more processors, such as CPUs 201 of FIG. 2, and 301 of FIG. 3, associated with one or more computing systems, such as user computing system 100 of FIG. 2, and/or security system provider computing system 150 of FIG. 3.

In one embodiment, when at DETERMINE THAT THE CIDR ASSOCIATED WITH THE MESSAGE IS ALSO ASSOCIATED WITH KNOWN TARGETED MALWARE 534 a determination is made that the CIDR associated with the connecting IP address or IP addresses within the received headers associated with the e-mail of RECEIVE A MESSAGE OPERATION 502 are historically associated with previously sent targeted malware, data indicating a status of the e-mail of RECEIVE A MESSAGE OPERATION 502 is transformed to a status indicating the e-mail is a potential targeted malware containing e-mail.

In one embodiment, at DETERMINE THAT THE CIDR ASSOCIATED WITH THE MESSAGE IS ALSO ASSOCIATED WITH KNOWN TARGETED MALWARE 534 the e-mail of RECEIVE A MESSAGE OPERATION 502 whose status data is transformed to indicate the e-mail is a potential targeted malware risk is forwarded to TAKE PROTECTIVE ACTION OPERATION 543.

In one embodiment, at TAKE PROTECTIVE ACTION OPERATION 543 protective action is taken against the e-mail of RECEIVE A MESSAGE OPERATION 502 determined to be a potential targeted malware risk including, but not limited to any one or more of: blocking the e-mail; flagging the e-mail as suspect and alerting the recipient; performing further analysis on the e-mail; or any other form of protective action as discussed herein, and/or as known in the art at the time of filing, and/or as developed after the time of filing.

In one embodiment, once protective action is taken against the e-mail of RECEIVE A MESSAGE OPERATION 502 determined to be a potential targeted malware risk at TAKE PROTECTIVE ACTION OPERATION 543, process flow proceeds to EXIT OPERATION 551 where process for detecting malware containing e-mails based on inconsistencies between a governmental agency "From" address and a sending IP address 500 is exited to await new data.

Using process for detecting malware containing e-mails based on inconsistencies between a governmental agency "From" address and a sending IP address 500, the country indicated by the governmental "From" address, and the connecting IP address or IP addresses within the received headers associated with an incoming e-mail are analyzed and if the CIDR associated with the connecting IP address or IP addresses within the received headers associated with the incoming e-mail are known to have previously been associated with targeted malware, one or more protective actions are taken to block the identified potential targeted malware attack. Therefore, process for detecting malware containing e-mails based on inconsistencies between a governmental agency "From" address and a sending IP address 400 provides a mechanism to potentially thwart this serious threat to public sector data that is unavailable using current detection systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "providing", "receiving", "analyzing", "extracting", "generating", "sending", "capturing", "monitoring", "obtaining", "requesting", "storing", "saving", "classifying", "comparing", "calculating", "processing", "using", "filtering", "extracting", "defining", "detecting", "transforming", "distributing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for detecting malware containing e-mails based on inconsistencies between a governmental agency "From" address and a sending IP address comprising:

receiving an e-mail;

using one or more processors associated with one or more computing systems to analyze the "From" heading of the e-mail to identify a "From" address associated with a government agency;

using one or more processors associated with one or more computing systems to determine that the "From" heading of the e-mail includes a "From" address associated with a government agency;

using one or more processors associated with one or more computing systems to determine the country associated with the government agency of the "From" address associated with a government agency in the "From" heading of the e-mail;

using one or more processors associated with one or more computing systems to identify one or more sending IP addresses associated with the e-mail;

using one or more processors associated with one or more computing systems to analyze the one or more sending IP addresses associated with the e-mail to determine geographical locations associated with the sending IP addresses associated with the e-mail;

using one or more processors associated with one or more computing systems to compare data indicating the country associated with the government agency of the "From" address associated with the government agency in the "From" heading of the e-mail and data indicating the geographical locations associated with the sending IP addresses associated with the e-mail;

using one or more processors associated with one or more computing systems to identify an inconsistency between the data indicating the country associated with the government agency of the "From" address associated with a government agency in the "From" heading of the e-mail and data indicating at least one of the geographical locations associated with the sending IP addresses associated with the e-mail;

using one or more processors associated with one or more computing systems to transform data indicating a status of the e-mail to a status of potential malware containing e-mail; and using one or more processors associated with one or more computing systems to take protective action associated with the e-mail.

2. The computing system implemented process for detecting malware containing e-mails based on inconsistencies between a governmental agency "From" address and a sending IP address of claim 1, wherein:

the e-mail is received at a user computing system.

3. The computing system implemented process for detecting malware containing e-mails based on inconsistencies between a governmental agency "From" address and a sending IP address of claim 1, wherein:

the e-mail is received at a security system provider computing system.

4. The computing system implemented process for detecting malware containing e-mails based on inconsistencies between a governmental agency "From" address and a sending IP address of claim 1, wherein:

the geographical locations associated with the sending IP addresses associated with the e-mail are determined based, at least in part, on a CIDR of the sending IP addresses associated with the e-mail.

5. The computing system implemented process for detecting malware containing e-mails based on inconsistencies between a governmental agency "From" address and a sending IP address of claim 1, wherein:

taking protective action associated with the e-mail includes taking at least one protective action selected from the group of protective actions consisting of:

blocking the e-mail from the recipient;

flagging the e-mail as suspect and alerting the recipient; and performing further analysis on the e-mail.

6. The computing system implemented process for detecting malware containing e-mails based on inconsistencies between a governmental agency "From" address and a sending IP address of claim 1, further comprising:

prior to analyzing the "From" heading of the e-mail to identify a "From" address associated with a government agency, using one or more processors associated with one or more computing systems to perform a preliminary filtering of the e-mail using a heuristic that excludes all e-mails that are text only e-mails, or do not include binary attachments, or that have only image based binary attachments, from further processing by the computing system implemented process for detecting malware containing e-mails based on inconsistencies between a governmental agency "From" address and a sending IP address.

7. The computing system implemented process for detecting malware containing e-mails based on inconsistencies between a governmental agency "From" address and a sending IP address of claim 1, further comprising:

using one or more processors associated with one or more computing systems to determine a CIDR associated with the sending IP addresses associated with the e-mail;

using one or more processors associated with one or more computing systems to determine if a CIDR associated with one or more of the sending IP addresses is known to be associated with historical distribution of malware; and if a CIDR associated with one or more of the sending IP addresses is known to be associated with historical distribution of malware, using one or more processors associated with one or more computing systems to take protective action associated with the e-mail.

8. A system for detecting malware containing e-mails based on inconsistencies between a governmental agency "From" address and a sending IP address comprising:

a security system;

an e-mail system;

at least one processor associated with at least one computing system, the at least one processor associated at least one computing system executing at least part of a process for detecting malware containing e-mails based on inconsistencies between a governmental agency "From" address and a sending IP address, the process for detecting malware containing e-mails based on inconsistencies between a governmental agency "From" address and a sending IP address comprising:

the security system intercepting an e-mail received through the e-mail system;

analyzing the "From" heading of the e-mail to identify a "From" address associated with a government agency;

determining that the "From" heading of the e-mail includes a "From" address associated with a government agency;

determining the country associated with the government agency of the "From" address associated with the government agency in the "From" heading of the e-mail;

identifying one or more sending IP addresses associated with the e-mail;

analyzing the one or more sending IP addresses associated with the e-mail to determine the geographical locations associated with the sending IP addresses associated with the e-mail;

comparing data indicating the country associated with the government agency of the "From" address associated with a government agency in the "From" heading of the e-mail and data indicating the geographical locations associated with the sending IP addresses associated with the e-mail;

identifying an inconsistency between the data indicating the country associated with the government agency of the "From" address associated with a government agency in the "From" heading of the e-mail and data indicating at least one of the geographical locations associated with the sending IP addresses associated with the e-mail;

transforming data indicating a status of the e-mail to a status of potential malware containing e-mail; and taking protective action associated with the e-mail.

9. The system for detecting malware containing e-mails based on inconsistencies between a governmental agency "From" address and a sending IP address of claim 8, wherein:

the e-mail is received at a user computing system.

10. The system for detecting malware containing e-mails based on inconsistencies between a governmental agency "From" address and a sending IP address of claim 8, wherein:

the e-mail is received at a security system provider computing system.

11. The system for detecting malware containing e-mails based on inconsistencies between a governmental agency "From" address and a sending IP address of claim 8, wherein:

the geographical locations associated with the sending IP addresses associated with the e-mail are determined based, at least in part, on a CIDR of the sending IP addresses associated with the e-mail.

12. The system for detecting malware containing e-mails based on inconsistencies between a governmental agency "From" address and a sending IP address of claim 8, wherein:

taking protective action associated with the e-mail includes taking at least one protective action selected from the group of protective actions consisting of:

blocking the e-mail from the recipient;

flagging the e-mail as suspect and alerting the recipient; and performing further analysis on the e-mail.

13. The system for detecting malware containing e-mails based on inconsistencies between a governmental agency "From" address and a sending IP address of claim 8, further comprising:

prior to analyzing the "From" heading of the e-mail to identify a "From" address associated with a government agency, using one or more processors associated with one or more computing systems to perform a preliminary filtering of the e-mail using a heuristic that excludes all e-mails that are text only e-mails, or do not include binary attachments, or that have only image based binary attachments, from further processing by the computing system implemented process for detecting malware containing e-mails based on inconsistencies between a governmental agency "From" address and a sending IP address.

14. The system for detecting malware containing e-mails based on inconsistencies between a governmental agency "From" address and a sending IP address of claim 8, further comprising:

determining a CIDR associated with the sending IP addresses associated with the e-mail;

determining if a CIDR associated with one or more of the sending IP addresses is known to be associated with historical distribution of malware; and if a CIDR associated with one or more of the sending IP addresses is known to be associated with historical distribution of malware, taking protective action associated with the e-mail.

15. A computing system implemented process for detecting malware containing e-mails based on inconsistencies between a governmental agency "From" address and a sending IP address comprising:

receiving an e-mail;

using one or more processors associated with one or more computing systems to analyze the "From" heading of the e-mail to identify a "From" address associated with a government agency;

using one or more processors associated with one or more computing systems to determine that the "From" heading of the e-mail includes a "From" address associated with a government agency;

using one or more processors associated with one or more computing systems to identify one or more sending IP addresses associated with the e-mail;

using one or more processors associated with one or more computing systems to analyze the one or more sending IP addresses associated with the e-mail to determine a CIDR associated with the sending IP addresses associated with the e-mail;

using one or more processors associated with one or more computing systems to determine if a CIDR associated with one or more of the sending IP addresses is known to be associated with historical distribution of malware; and if a CIDR associated with one or more of the sending IP addresses is known to be associated with historical distribution of malware, using one or more processors associated with one or more computing systems to take protective action associated with the e-mail.

16. The computing system implemented process for detecting malware containing e-mails based on inconsistencies between a governmental agency "From" address and a sending IP address of claim 15, wherein:

the e-mail is received at a user computing system.

17. The computing system implemented process for detecting malware containing e-mails based on inconsistencies between a governmental agency "From" address and a sending IP address of claim 15, wherein:

the e-mail is received at a security system provider computing system.

18. The computing system implemented process for detecting malware containing e-mails based on inconsistencies between a governmental agency "From" address and a sending IP address of claim 15, wherein:

taking protective action associated with the e-mail includes taking at least one protective action selected from the group of protective actions consisting of:

blocking the e-mail from the recipient;

flagging the e-mail as suspect and alerting the recipient; and performing further analysis on the e-mail.

19. The computing system implemented process for detecting malware containing e-mails based on inconsistencies between a governmental agency "From" address and a sending IP address of claim 15, further comprising:

prior to analyzing the "From" heading of the e-mail to identify a "From" address associated with a government agency, using one or more processors associated with one or more computing systems to perform a preliminary filtering of the e-mail using a heuristic that excludes all e-mails that are text only e-mails, or do not include binary attachments, or that have only image based binary attachments, from further processing by the computing system implemented process for detecting malware containing e-mails based on inconsistencies between a governmental agency "From" address and a sending IP address.

\* \* \* \* \*